(12) United States Patent
Bailey et al.

(10) Patent No.: US 7,774,424 B1
(45) Date of Patent: Aug. 10, 2010

(54) METHOD OF RATE SNOOPING IN A SAS/SATA ENVIRONMENT

(75) Inventors: Patrick Neil Bailey, Port Coquitlam (CA); Larrie Simon Carr, Nelson (CA)

(73) Assignee: PMC-Sierra, Inc., Santa Clara, CA (US)

( * ) Notice: Subject to any disclaimer, the term of this patent is extended or adjusted under 35 U.S.C. 154(b) by 745 days.

(21) Appl. No.: 11/470,042

(22) Filed: Sep. 5, 2006

Related U.S. Application Data

(60) Provisional application No. 60/713,326, filed on Sep. 2, 2005.

(51) Int. Cl.
*G06F 15/16* (2006.01)
(52) U.S. Cl. .................................. 709/211; 709/217
(58) Field of Classification Search ................. None
See application file for complete search history.

(56) References Cited

U.S. PATENT DOCUMENTS

| | | | | |
|---|---|---|---|---|
| 7,181,562 B1* | 2/2007 | Stenfort et al. | .............. | 710/315 |
| 7,373,541 B1* | 5/2008 | Stenfort et al. | .............. | 713/503 |
| 2003/0115413 A1* | 6/2003 | Wood et al. | .................. | 711/114 |
| 2005/0055456 A1* | 3/2005 | Chalupsky et al. | .......... | 709/233 |
| 2005/0138258 A1* | 6/2005 | Seto | ........................... | 710/301 |
| 2005/0251588 A1* | 11/2005 | Hoch et al. | ..................... | 710/5 |
| 2006/0047908 A1* | 3/2006 | Chikusa et al. | ............. | 711/114 |
| 2007/0005850 A1* | 1/2007 | Chang et al. | .................. | 710/74 |

\* cited by examiner

*Primary Examiner*—Donald L Mills
*Assistant Examiner*—Steven Wood
(74) *Attorney, Agent, or Firm*—Curtis B. Behmann; Borden Ladner Gervais LLP

(57) ABSTRACT

A method and apparatus for determining a set of common link rates for communication between two storage network elements in a storage network system. During the speed negotiation process, a controlling storage network element receives supported link rate information from a connected storage network element without providing any information in return. By not providing such information, although the speed negotiation process may not be completed, the controlling storage network element is still able to determine the supported link rates of the connected storage network element.

30 Claims, 6 Drawing Sheets

METHOD OF RATE SNOOPING IN A SAS/SATA ENVIRONMENT

CROSS REFERENCE TO RELATED APPLICATIONS

This application claims the benefit of priority of U.S. Provisional Patent Application No. 60/713,326 filed Sep. 2, 2005, which is incorporated herein by reference.

FIELD OF THE INVENTION

The present invention relates generally to SAS/SATA storage systems. More particularly, the present invention relates to a method of rate snooping in a SAS/SATA environment.

BACKGROUND OF THE INVENTION

In the field of storage network systems, the current standards require that speed negotiation be performed between two communicating parties, such as a pair of storage network elements, before communication is enabled. In the standard-based rate negotiation process, the two communicating parties attempt to form connections at their highest commonly supported link rate by having one party determine the other party's supported link rates. However when a storage network system is composed of multiple pairs of network elements achieving a common link across all network element pairs can result in a process known as rate thrashing.

Rate thrashing begins when each of the network element pairs speed negotiates to their own highest commonly supported rates, and these rates are not equivalent across all network element pairs in the storage network system. The storage network system must then re-initiate speed negotiation on some or all of the network element pairs in hopes of achieving an equivalent rate across all network element pairs in the storage network system. The storage network system may have to re-initiate speed negotiation multiple times and rate thrashing occurs.

For applications where multiple SAS/SATA network element pairs are used within a SATA Port Selector, an embedded processor or control unit usually ensures that each network element pair is operating at the same link rate. This operation is performed by allowing all the network element pairs to speed negotiate independently, followed by a check for consistency and then re-initiating speed negotiation with a set of constrained link rates.

However, the traditional SATA Port Selector causes problems when operating within a SAS topology. A SAS initiator device or expander device connected to a SATA Port Selector may require that the SATA Device connected to the SATA Port Selector remain in the SATA HOLD state until such time as the SATA Port Selector can speed negotiate to all network elements without rate thrashing. Furthermore when a SAS link reset is performed, the SATA Device should normally come out of SATA HOLD state, but speed negotiation and rate thrashing may undesirably put the SATA Device back into the SATA HOLD state.

It is, therefore, desirable to provide a novel method of rate snooping in a storage network system.

SUMMARY OF THE INVENTION

It is an object of the present invention to obviate or mitigate at least one disadvantage of previous methods of speed negotiation in storage network systems.

In one embodiment of the invention, to solve this problem, the speed negotiation process is controlled so that the rate consistency check can be performed or snooped without the link becoming active (i.e. reaching the PHYRDY state). The method is enabled only when the PHY state machine of the network element transitions through the COMINIT state. The method depends on the operating mode of the PHY state machine.

Moreover, during the speed negotiation process, by not transmitting selective information to the connected storage network element, the device (storage network element) performing the method is able to trick the connected storage network element so that the connected storage network element is unable to confirm a common link rate and does not transition to the active, or PHYRDY state. Therefore, only after the device performing the method has determined the common link rates is this information reported to the storage network system in order to reduce/prevent rate thrashing.

In a first aspect, the present invention provides a method of determining a set of common link rates for communication between a device having a set of supported link rates and a storage network element in a storage network system, comprising the steps of a) transmitting an initial data stream to the storage network element at one of the supported link rates; b) receiving a reply data stream from the storage network element at the one of the supported link rates; c) reporting the one of the supported link rates as a common link rate if the reply data stream is received, and d) repeating steps a) to c) for each of the remaining supported link rates without the storage network element entering an active state with the device.

In a further embodiment, there is an apparatus provided for determining a set of common link rates for communication between a device having a set of supported link rates and a storage network element in a storage network system, the device comprising a controller having a transmitter and a receiver for communicating with the storage network element, the transmitter for transmitting an initial data stream to the storage network element at the supported link rates and the receiver for receiving a reply data stream from the storage network element; and a control unit for storing a list of common link rates; wherein when the controller receives the reply data stream, the controller reports to the control unit to store a link rate at which the reply data stream was transmitted as a common link rate in the list of common link rates.

In yet another embodiment, there is provided a computer readable medium containing computer instructions which, when executed, perform a method of determining a set of common link rates for communication between a device having a set of supported link rates and a storage network element in a storage network system, comprising instructions for transmitting an initial data stream to the storage network element at one of the supported link rates; instructions for receiving a reply data stream from the storage network element at the one of the supported link rates; instructions for reporting the one of the supported link rates as a common link rate if the reply data stream is received; and instructions for repeating the steps for each of the remaining supported link rates without the storage network element entering an active state with the device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for determining common link rates in a storage network system.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

Figure 1:
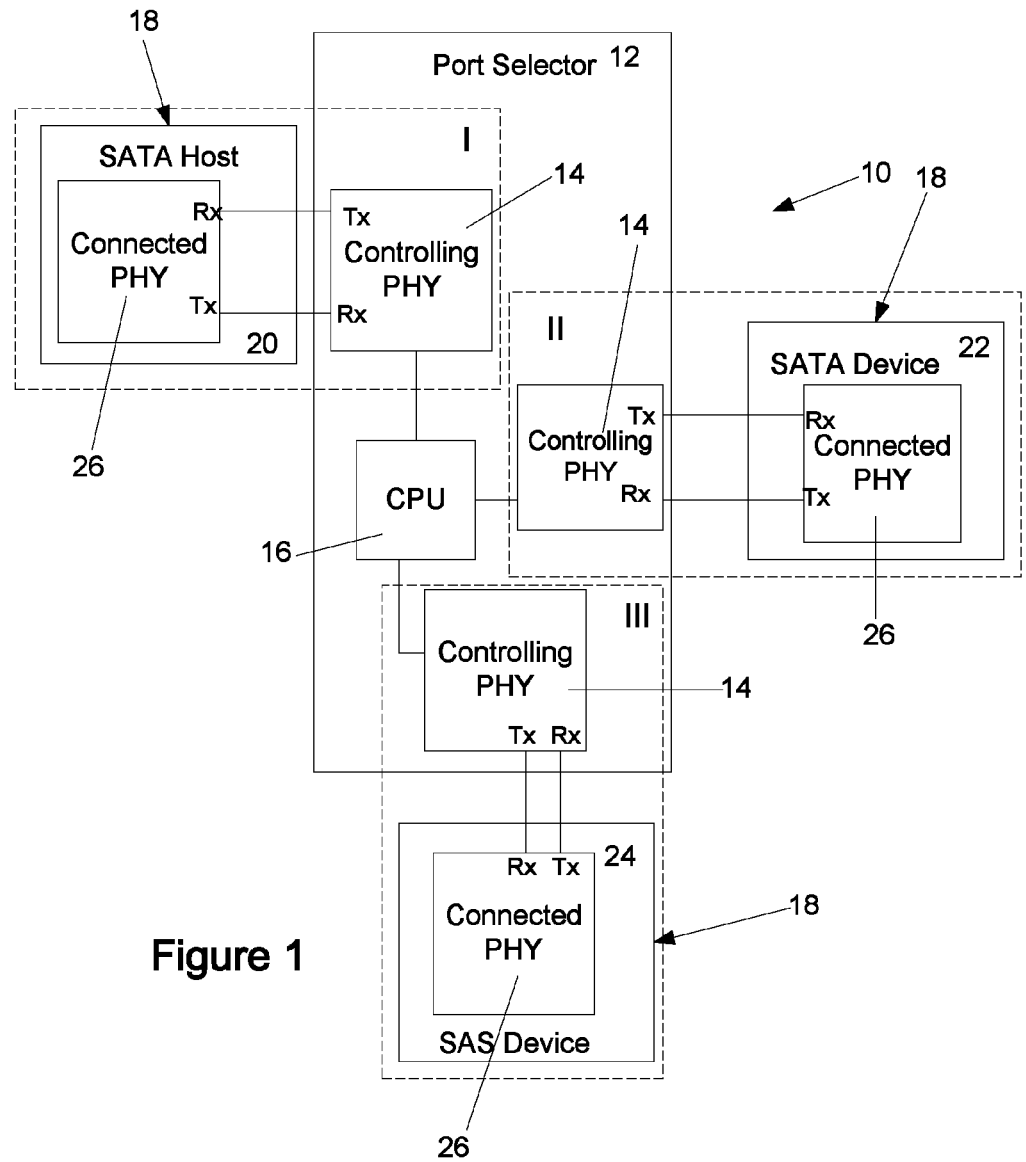
FIG. 1 is a schematic diagram of apparatus for implementing rate snooping in a storage network system.

Turning to FIG. 1, a schematic diagram of an apparatus for implementing the method of the invention is shown. The apparatus 10 includes a port selector 12, comprising controllers, seen as a plurality of PHYs 14 and a control unit, such as a CPU 16, which is connected to plurality of storage network elements 18 seen as a SATA Host 20, a SATA Device 22 and a SAS Device 24. Although only one of each of these types of storage network elements is shown, it will be understood that any number of storage network elements 18 may be attached to the port selector 12.

Each of the SATA Host 20, the SATA Device 22, and the SAS Device 24 includes a PHY 26 which is connected to the PHYs 14 within the port selector 12. As will be discussed in more detail below, the PHYs 26 are seen as being connected, or attached, while the PHYs 14 are seen as controlling PHYs. A PHY is an integrated circuit or a functional block of a circuit that monitors and manages the encoding and decoding between a pure digital domain and a modulation in the analog domain.

Each of the controllers, or PHYs, 14 within the port selector 12, preferably includes a transmitter and receiver to communicate with the PHYs 26 within the storage network elements 18 and communicates with the CPU 16. The controllers typically communicate with the storage network elements to transmit an initial data stream to the storage network element at supported link rates and receive a reply data stream from storage network element to determine if a set of common link rates between the controller and the storage network element. Unlike conventional controllers, the controller does not transmit any information regarding its supported link rates to the storage network element so that the storage network element is unable to enter an active, or PHYRDY state.

In the current invention, in order to determine the supported link, or data, rates supported by the SATA Host 20, the SATA Device 22 and the SAS Device 24, the port selector 12 acts as a SATA Device, a SATA Host and a SAS Device, respectively.

Figure 2:
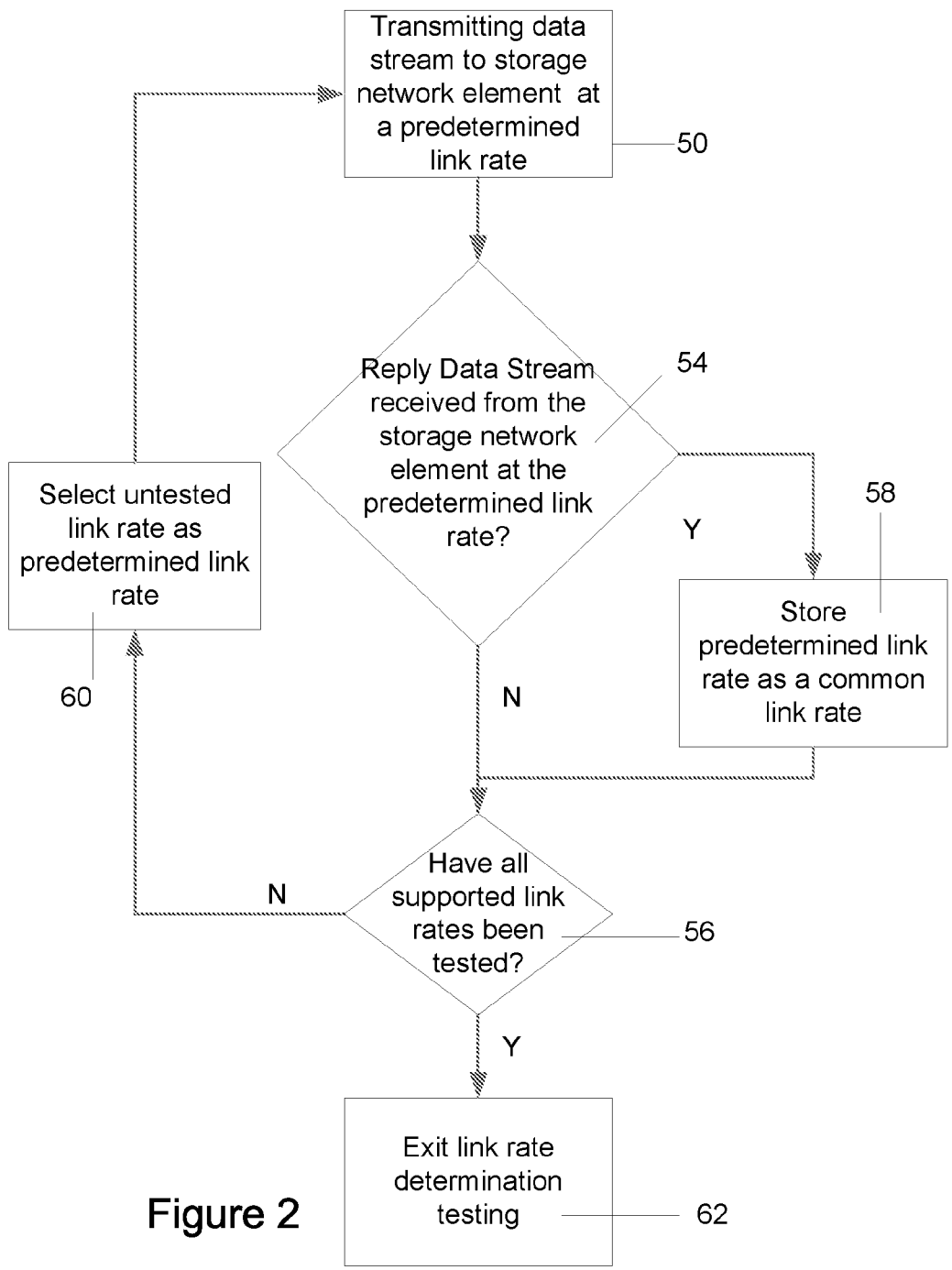
FIG. 2 is a flowchart outlining an embodiment of a method of rate snooping in a storage network system.

Turning to FIG. 2, a flowchart outlining an embodiment of a method of rate snooping in a storage network system is shown. The rate snooping is performed on one of the storage network elements 18 by, preferably, the port selector 12. The port selector 12 controls the rate snooping on the storage network element.

In order to initiate the rate snooping process, the controller, or controlling device, such as one of the controlling PHYs in the port selector 12 transmits an initial data stream to the storage network element at a predetermined link rate which is supported by the controller (step 50). After transmitting the initial data stream, the controller awaits a data stream from the storage network element at the predetermined link rate. A check is then performed, after a predetermined period of time (step 54) to determine if a reply data stream has been returned by the storage network element.

If the data stream has not been received, a determination is made to see whether or not each of the link rates supported by the controller has been tested (step 56). Alternatively, if the data stream has been received from the storage network element, the predetermined link rate is stored as a common link rate which is supported for communication by the storage network element (step 58). After storing this information, a determination is made to see whether or not each of the link rates supported by the controller has been tested (step 56).

If not all the link rates have been tested, one of the untested link rates is selected as the predetermined link rate (step 60) and steps 50 to 54 are performed with respect to this new link rate. However, if all the link rates have been tested, the rate snooping, or link rate determination testing, is determined to be completed (step 62). The set of common link rates is then stored so that it may be accessed later. After the set of common link rates has been stored or determined, the controlling PHY may transmit information to the connected PHY allowing the storage network element associated with the controlling PHY to enter the active, or PHYRDY, state. In one embodiment, the normal speed negotiation process is restarted and performed with the set of common link rates. According to standards, if a connected PHY does not reach the active state, the speed negotiation process is automatically restarted.

Unlike conventional speed negotiation methods where the controlling PHY confirms its own supported rates to the connected PHY, in the current invention, the controlling PHY withholds this information from the connected PHY so that the speed negotiation process does not complete and the connected PHY does not enter the active state. Yet, the controlling PHY is able to determine the link rates which are supported by the connected PHY.

Figure 3:
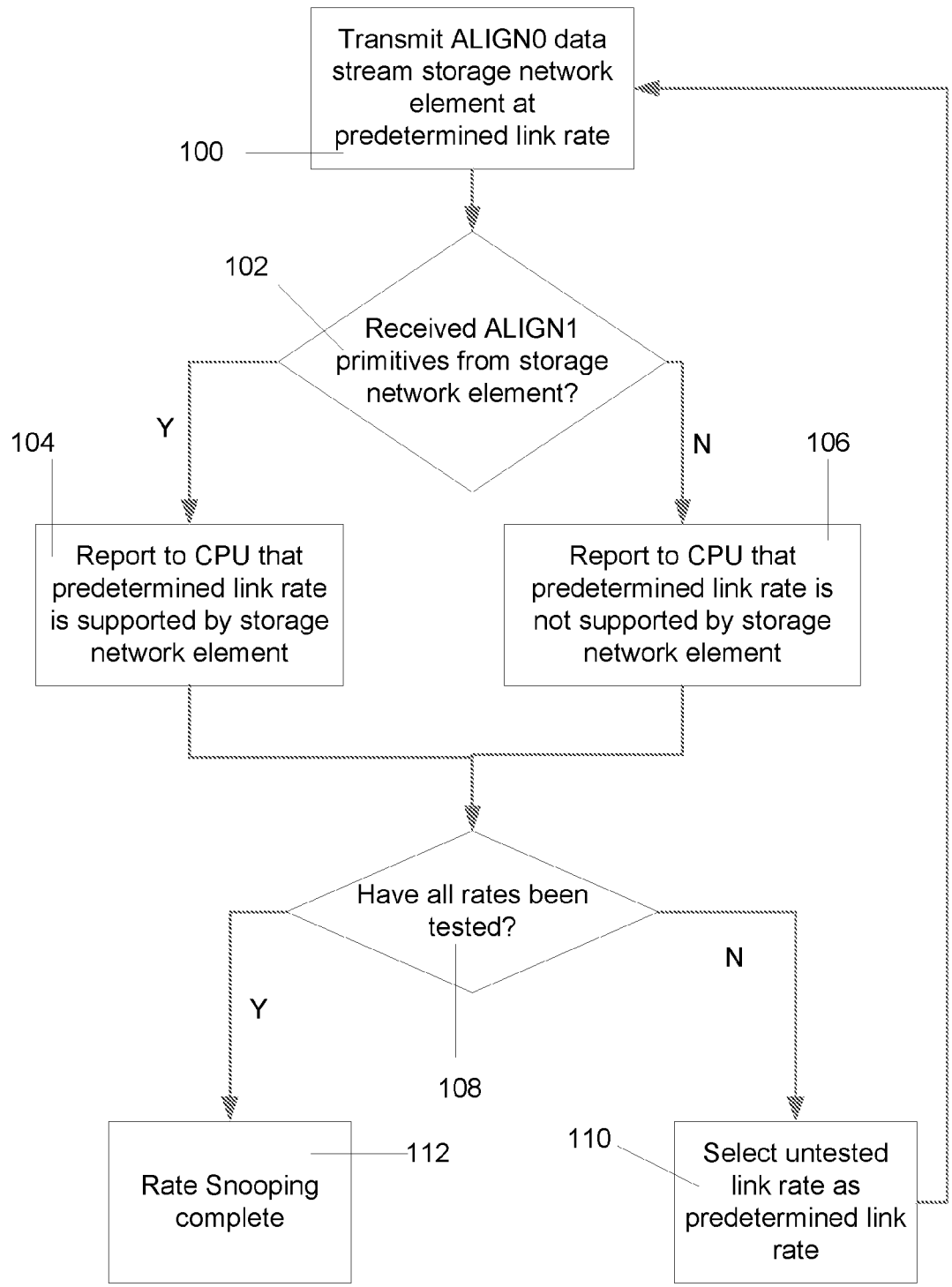
FIG. 3 is a flowchart outlining an embodiment of a method of rate snooping in a SAS system.
Figure 6A:
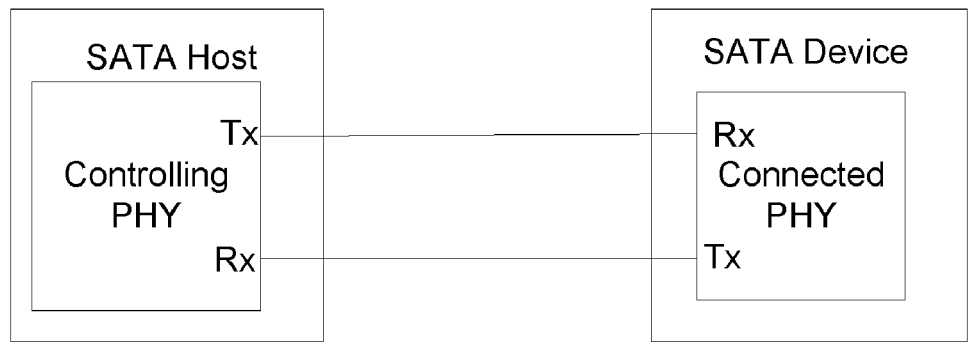
FIGS. 6a, 6b and 6c are schematic representations of further embodiments of apparatus for rate snooping in a storage network system.
Figure 6B:
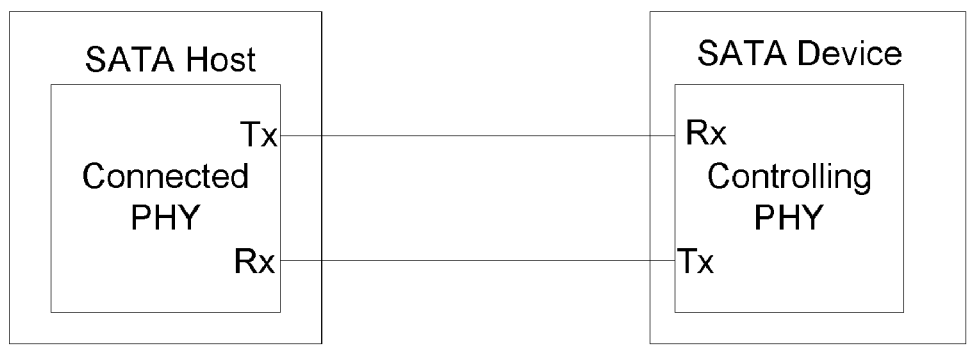
Figure 6C:
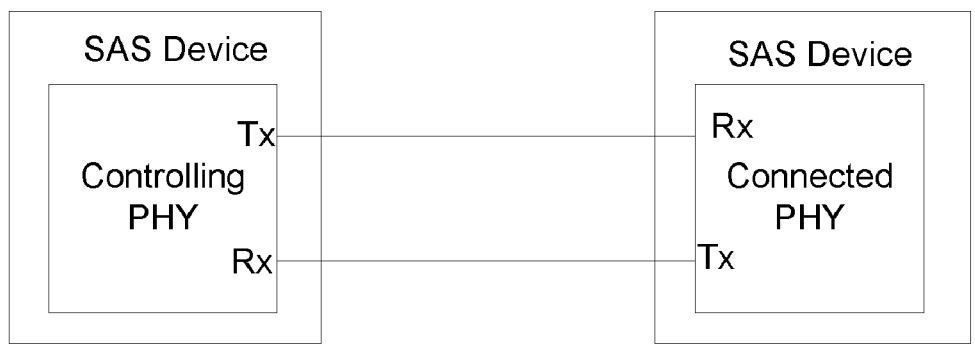

Turning to FIG. 3, a flowchart representing an embodiment of a method of rate snooping in a SAS storage network system as schematically illustrated in box III of FIG. 1 and FIG. 6c is shown. Speed negotiation on a SAS link is based on a peer-to-peer negotiation technique that does not assume initiator and target roles. It will be understood by one skilled in the art that only link rates of 1.5 Gbps and 3.0 Gbps are currently supported but others may be supported in the future. Although the embodiments of the Figures provide discussion relating to the 1.5 and 3.0 Gbps link rates, it will be understood that the methods may be performed for other link rates when they are eventually supported.

As will be understood, communication between the port selector 12 and the SAS Device 24 is between the controlling PHY 14 of the port selector 12 and the connected PHY 26 of the SAS Device 24.

In each embodiment, it is assumed that the controlling PHY is capable of transmitting at 3.0 Gbps and 1.5 Gbps, however, it will be understood that the controlling PHY 14 may only support one of these link rates. In this current embodiment, for example purposes only, the connected PHY is only capable of transmitting at 1.5 Gbps. The first predetermined link rate to be tested is 1.5 Gbps.

The controlling PHY transmits an initial data stream, seen as an ALIGN0 (Dword Sync) data stream, to the connected PHY (step 100) at the link rate of 1.5 Gbps. After transmission of the initial data stream, the controlling PHY waits for a reply data stream from the connected PHY (step 102). Since the connected PHY is capable of supporting the predetermined link rate of 1.5 Gbps, upon receipt of the initial data stream, the connected PHY transmits the reply data stream, preferably a set of ALIGN1 primitives or ALIGN1 data stream, to the controlling PHY 14. In order to perform the rate snooping method, even though the controlling PHY 14 supports the link rate of 1.5 Gbps, the controlling PHY 26 does not transmit ALIGN1 primitives to the connected PHY 14 in response to the reply ALIGN1 reply data stream. In this manner, the storage network element assumes that the PHY (the controlling PHY) with which it is communicating does not support this link rate and therefore the storage network element can not enter the active state.

After receiving the reply data stream from the connected PHY, the controlling PHY 14 reports to the CPU 16 that the SAS Device 24 supports the link rate of 1.5 Gbps (step 104).

After the message has been sent to the CPU (step 104), the CPU 16, or the controlling PHY, determines if all the link rates supported by the controlling PHY have been tested (step 108). In this case, since the link rate of 3.0 Gbps has not been tested, the predetermined link rate is changed from 1.5 to 3.0 Gbps (step 110).

The ALIGN0 data stream is then transmitted from the controlling PHY 14 to the connected PHY 26 of the SAS Device 24 at the predetermined link rate of 3.0 Gbps (step 100). Since the SAS Device 24 does not support this link rate, there is no reply data stream transmitted from the connected PHY to the controlling PHY. Therefore, at step 102, since the ALIGN1 primitives data stream is not received from the SAS Device 24 before a predetermined period of time, the controlling PHY 14 reports to the CPU 16 that the link rate of 3.0 Gbps is not supported by the SAS Device 24 (step 106).

A check is then performed to determine if all the link rates supported by the controlling PHY have been tested (step 108) and since they have, the rate snooping is determined to be complete (step 112).

As discussed above, the controlling PHY withholds its list of supported link rates from the connected PHY so that the speed negotiation process does not complete. Yet, the controlling PHY is able to determine the link rates which are supported by the connected PHY.

Figure 4:
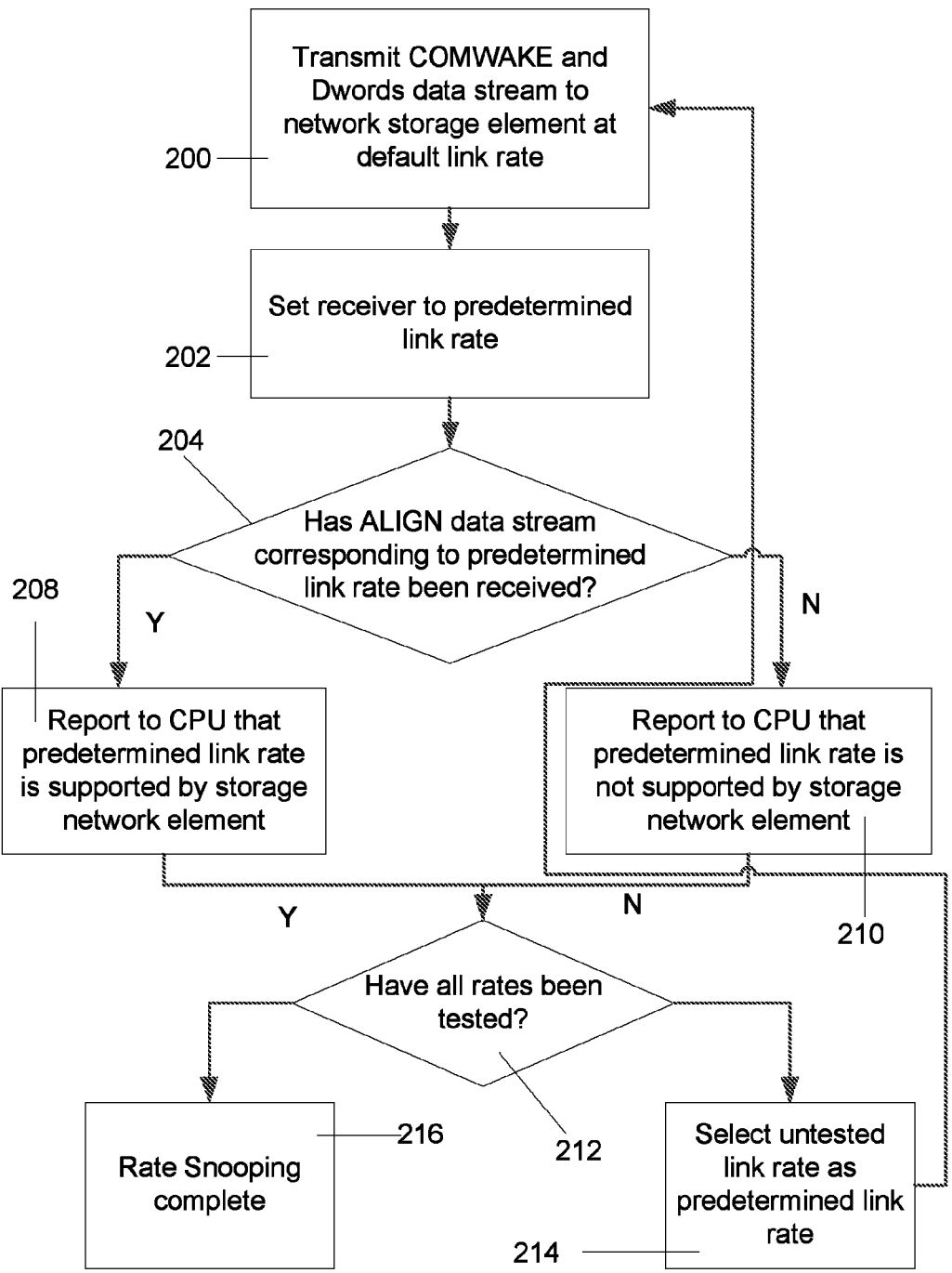
FIG. 4 is a flowchart outlining an embodiment of a method of rate snooping in a SATA Host system.

Turning to FIG. 4, a flowchart outlining a method of determining a set of common link rates in a SATA Host system is shown. This is schematically shown in Box II of FIG. 1 and FIG. 6a. As will be understood, the controlling PHY 14 is located in the port selector 12 which acts as a SATA Host in this embodiment. The PHY associated with the SATA Device 22 is the attached, or connected, PHY. As an assumption, both the controlling PHY and the connected PHY are capable of supporting link rates of 1.5 and 3.0 Gbps. The predetermined link rate which is typically used to begin the rate snooping process is 1.5 Gbps.

Prior to the transmission of a Dwords data stream, the controlling PHY 14 and the connected PHY exchange a COMWAKE signal to trigger speed negotiation as SATA communications are based on a master/slave relationship. The controlling PHY 14 then transmits a data stream, seen as a D10.2 data stream pattern of Dwords, at a default link rate, which is typically the lower, or lowest, supported rate of 1.5 Gbps (step 200), and sets its receiver to the predetermined link rate of 1.5 Gbps (step 202).

Upon receipt of the COMWAKE signal, the connected PHY 26 of the SATA Device 22 typically transmits a reply data stream, seen as an ALIGN0 data stream, to the controlling PHY at each of its supported link rates starting with the higher supported rate of 3.0 Gbps which is detected by the receiver of the controlling PHY. This is typically transmitted for a period of 54.6 microseconds. After transmitting the ALIGN0 data stream at the link rate of 3.0 Gbps, the connected PHY 26 transmits the ALIGN0 data stream to the controlling PHY 14 at the link rate of 1.5 Gbps for a period of 54.6 microseconds. This ALIGN0 data stream is also received by the controlling PHY.

As the connected PHY does not receive any confirmation of the receipt of the ALIGN0 data stream from the controlling PHY, typically seen as ALIGN0 primitives, the connected PHY waits for a new PHY Reset Sequence. This prevents the storage network element, or SATA Device 22, to enter an active, or PHYRDY state, before all common link rates are determined.

The controlling PHY 14 then determines if an ALIGN0 data stream from the connected PHY was received at the predetermined link rate of 1.5 Gbps (step 204). In this example, the controlling PHY has received such a data stream and therefore reports to the CPU 16 that the SATA Device 22 supports communication at the link rate of 1.5 Gbps (step 208) i.e. the link rate of 1.5 Gbps is a common link rate. Alternatively, if the controlling PHY does not receive such a data stream, it is determined that the connected PHY, or SATA Device 22, does not support this link rate and this is reported to the CPU 16 (step 210). The CPU 16 preferably stores the set of common links.

After the reporting has been completed (step 208 or step 210), a check is performed to determine if the controlling PHY has snooped at all its supported rates (step 212). In this example, it has not, so an untested link rate is selected and set as the predetermined link rate (step 214), which in the current example is 3.0 Gbps. Therefore, to test this rate, the receiver of the controlling PHY must be set to 3.0 Gbps in order to receive any reply data stream from the connected PHY which is transmitted at 3.0 Gbps.

The controlling PHY repeats Out-of-Band (OOB) signaling and then exchanges a COMWAKE signal and transmits the D10.2 data stream pattern of Dwords to the connected PHY 26 at the link rate of 1.5 Gbps (step 200) and sets its receiver to the predetermined link rate of 3.0 Gbps. As before, the connected PHY of the SATA Device 22 transmits the ALIGN0 data stream to the controlling PHY using all of its supported link rates, namely 1.5 and 3.0 Gbps. The controlling PHY receives all of the ALIGN0 data streams from the connected PHY (step 202) and then determines if it has received an ALIGN0 data stream at the rate of 3.0 Gbps (step 204). In this example, since the controlling PHY 14 receives the ALIGN0 data stream at 3.0 Gbps, this is reported to the CPU 16 (step 208) indicating that the SATA Device 22 supports communication at the link rate of 3.0 Gbps. Since all link rates are determined to be snooped (step 212), the method of determining supported link rates is complete (step 216).

Figure 5:
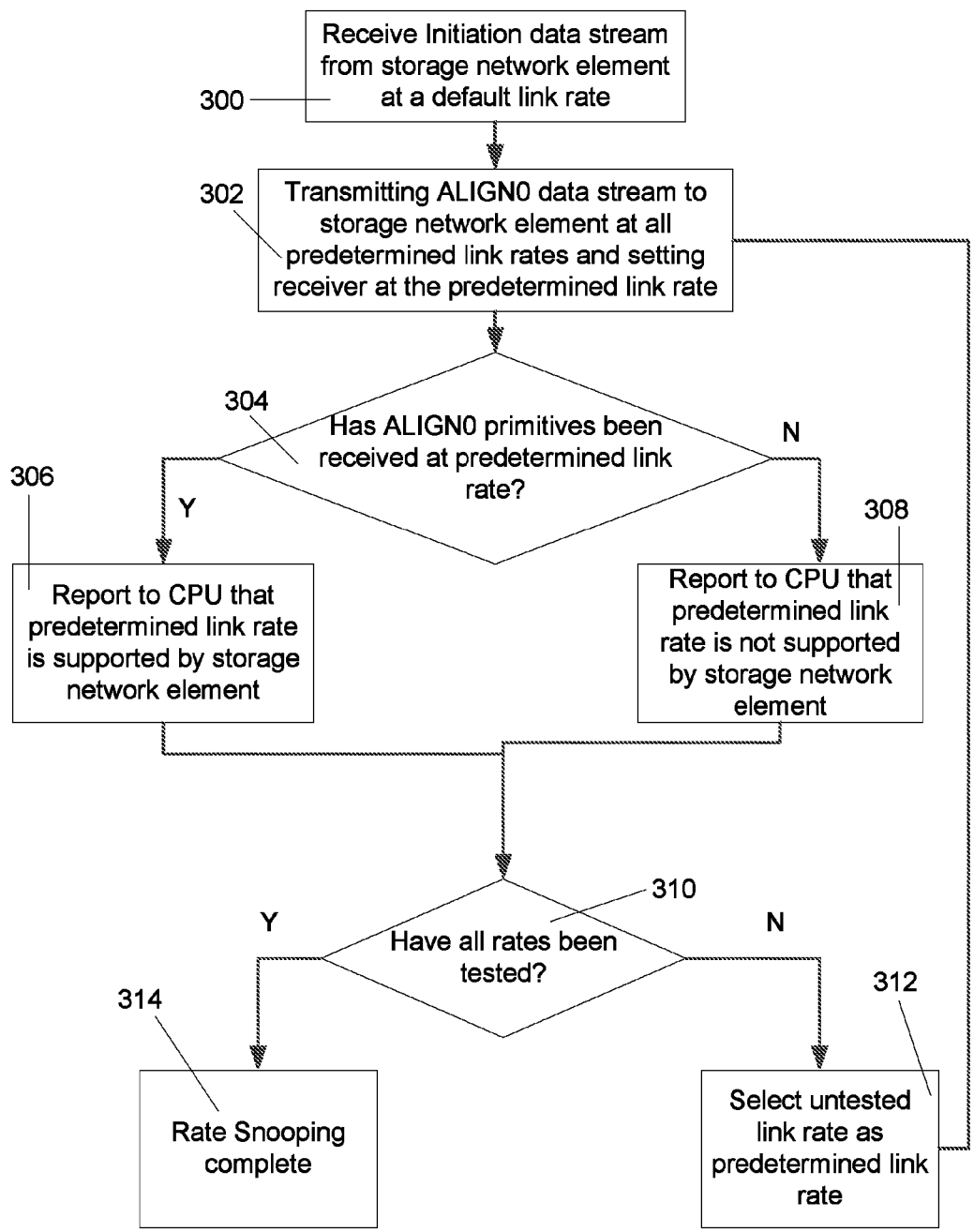
FIG. 5 is a flowchart outlining an embodiment of a method of rate snooping in a SATA Device system.

Turning to FIG. 5, an embodiment of a method of determining a set of common link rate in a SATA Device system is shown. This example is schematically shown in Box I of FIG. 1 and FIG. 6b. In this embodiment, the controlling PHY is located within the port selector 12 while the connected PHY is located in a storage network element 18 such as the SATA Host 20. In this embodiment, it is assumed that the controlling PHY supports link rates of 1.5 and 3.0 Gbps while the connected PHY 26 in the SATA Host 20 supports 1.5 Gbps. For this embodiment, the transmitter and the receiver of the controlling PHY 14 are set at 3.0 Gbps.

Initially, the controlling PHY 14 receives an initiation signal, seen as a COMWAKE and, possibly a D10.2 data stream pattern of Dwords, from the connected PHY (step 300) at a default link rate such as the lowest supported link rate of the storage network element 18 (the SATA Host 20) being snooped. After receiving the COMWAKE data stream, the controlling PHY 14 transmits an initial data stream, such as an ALIGN0 data stream at its highest supported link rate (3.0 Gbps) to the connected PHY (step 302), typically for 54.6 microseconds.

During this transmission, the receiver of the controlling PHY 14 waits to receive a reply data stream (such as a set of ALIGN0 primitives) from the connected PHY (step 304). If the controlling PHY 14 receives the ALIGN0 primitives, the controlling PHY reports to the CPU 16 that the link rate of 3.0 Gbps is supported by the connected PHY (step 306). Otherwise, if the ALIGN0 primitives data stream is not received (as in the current example), the controlling PHY reports to the CPU 16 that the connected PHY does not support a link rate of 3.0 Gbps (step 308).

The controlling PHY does not transmit any other data streams (such as non-ALIGN0 data) to the connected PHY to confirm the link rates which it supports in order to prevent the connected PHY from determining such information and to prevent the connected PHY from entering the active, or PHYRDY state.

A check is then performed to determine if all of the supported link rates have been snooped (step 310). However, since the controlling PHY has not transmitted an initial data stream at 1.5 Gbps, the predetermined link rate is updated to 1.5 Gbps (step 312) and steps 300 to 304 and one of steps 306/308 are repeated for the link rate of 1.5 Gbps. In this example, since the SATA Host 20 supports the link rate of 1.5 Gbps, this common link rate is stored by the CPU 16.

After the reporting step has been completed and since all link rates are snooped, the rate snooping method is deemed complete (step 314).

Turning to FIGS. 6a, 6b and 6c, further embodiments of apparatus for rate snooping in a storage network system are shown. In each of these embodiments, there is no need for a port selector since the storage network elements are directly connected. In FIG. 6a, the PHY within the SATA Host acts as the controller, or controlling PHY, and is directly attached to a connected PHY within the SATA Device. FIG. 6b shows the controller, or controlling PHY, in the SATA Device attached to a connected PHY within the SATA Host. FIG. 6c shows the controller, or controlling PHY, in a SAS Device and the connected PHY within another SAS Device. As can be seen, communication between the PHYs is via individual transmitters and receivers within each of the storage network elements.

In an alternative embodiment, the rate changes may occur within a single reset sequence or the rate change can occur over multiple reset sequences. For instance, in the SATA system, the entire rate snooping processing may be completed after a single OOB sequence or the testing of each link rate may be performed after separate OOB sequences.

Furthermore, another advantage of the invention is that by having the supported link rates of the connected PHYs determined prior to the PHYRDY state, a single link rate, supported by all connected PHYs may be determined so that communication in the overall storage network system is improved.

It will be understood by one skilled in the art that the controlling and connected PHYs can support 1.5 Gbps, 3.0 Gbps or both link rates and do not necessarily always support all link rates as has been indicated in some of the above examples. For this reason, there may not be a common link rate determined by the snooping process. Furthermore, although each example discusses only two link rates, namely 1.5 and 3.0 Gbps, it will be understood that other link rates may be tested or supported in future embodiments. Yet a further advantage of the invention is that the controlling PHY is able to determine the transmission rate of the connected PHY without having to supply the same information to the connected PHY. This allows all supported link rates to be determined before a device, such as a port selector, proceeds to communicate with all connected PHYs so that the communication link rate between all PHYs in the storage network elements is commonly supported.

Other storage network elements which are contemplated include a SAS Initiator Device, a SAS Target Device, a SAS Host Controller or a SAS Expander.

In a further embodiment, instead of a D10.2 data stream pattern of Dwords, the stream pattern may be a D21.5 data stream pattern.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of determining a set of common link rates for communication between a device having a set of supported link rates and a Serial Attached Small Computer System Interface or a Serial Advanced Technology Attachment (SAS/SATA) storage network element in a SAS/SATA storage network system, comprising:

a) transmitting an initial data stream to said SAS/SATA storage network element at one of said supported link rates;
b) receiving a reply data stream from said SAS/SATA storage network element at said one of said supported link rates;
c) reporting said one of said supported link rates as a common link rate if said reply data stream is received;
d) repeating steps b) to c) for each of said remaining supported link rates without said SAS/SATA storage network element entering an active state with said device;
e) determining a single link rate supported by all connected PHYs communicating in said SAS/SATA storage network system, the single link rate being one of said common link rates; and
f) restarting and performing speed negotiation to completion with one of said common link rates reported in step c).

2. The method of claim 1 wherein step d) includes repeating step a) for each of said remaining supported link rates.

3. The method of claim 1 wherein said SAS/SATA system is a Serial Attached Small Computer System Interface (SAS) system and wherein step a) comprises transmitting an ALIGN0 data stream.

4. The method of claim 1 wherein said SAS/SATA system is a SAS system wherein step b) comprises receiving an ALIGN1 data stream.

5. The method of claim 1 wherein said SAS/SATA system is a Serial Advanced Technology Attachment (SATA) Host system and wherein step a) comprises transmitting a D10.2 data stream pattern of Dwords or a D21.5 data stream pattern of Dwords.

6. The method of claim 1 wherein said SAS/SATA system is a SATA Host system wherein step a) comprises transmitting a COMWAKE signal.

7. The method of claim 1 wherein said SAS/SATA system is a SATA Host system wherein step b) comprises receiving an ALIGN0 data stream.

8. The method of claim 1 wherein said SAS/SATA system is a SATA Device system further comprising, prior to step a):
receiving an initiation signal from said storage network element.

9. The method of claim 8 wherein said step of receiving an initiation signal comprises receiving a COMWAKE signal.

10. The method of claim 1 wherein said SAS/SATA system is a SATA Device system wherein step a) comprises transmitting an ALIGN0 data stream.

11. The method of claim 1 wherein said SAS/SATA system is a SATA Device system wherein step b) comprises receiving an ALIGN0 data stream.

12. The method of claim 1 further comprising after step c):
storing said common link rate in a list of common link rates.

13. The method of claim 12 further comprising:
generating said list of common link rates.

14. Apparatus for determining a set of common link rates for communication between a device having a set of supported link rates and a Serial Attached Small Computer System Interface or a Serial Advanced Technology Attachment (SAS/SATA) storage network element in a SAS/SATA storage network system, said device comprising:
a controller having a transmitter and a receiver for communicating with said SAS/SATA storage network element, said transmitter for transmitting an initial data stream to said SAS/SATA storage network element at said supported link rates and said receiver for receiving a reply data stream from said SAS/SATA storage network element; and
a control unit for storing a list of common link rates;
wherein when said controller receives said reply data stream, said controller reports to said control unit to store a link rate at which said reply data stream was transmitted as a common link rate in said list of common link rates,
wherein said apparatus determines a single link rate supported by all connected PHYs communicating in said SAS/SATA storage network system, the single link rate being in said list of common link rates, and
wherein said controller restarts and performs speed negotiation to completion with said common link rate.

15. The apparatus of claim 14 wherein said SAS/SATA storage network system is a SAS system.

16. The apparatus of claim 14 wherein said SAS/SATA storage network system is a SATA system.

17. The apparatus of claim 16 wherein said SAS/SATA storage network element is selected from the group consisting of a SATA Host, a SATA Device, a SAS Initiator Device, a SAS Target Device, a SAS Host Controller and a SAS Expander.

18. The apparatus of claim 14 wherein said controller is a controlling PHY.

19. The apparatus of claim 18 wherein said controlling PHY is selected from the group consisting of a SATA Host PHY, a SATA Port Selector Device PHY, a SAS PHY performing SATA Host emulation, a SATA Device PHY, a SATA port selector host and a SAS PHY.

20. The apparatus of claim 14 wherein said control unit is a central processing unit (CPU).

21. A non-transitory computer readable storage medium containing computer instructions which, when executed, perform a method of determining a set of common link rates for communication between a device having a set of supported link rates and a Serial Attached Small Computer System Interface or a Serial Advanced Technology Attachment (SAS/SATA) storage network element in a SAS/SATA storage network system, comprising:
instructions for transmitting an initial data stream to said SAS/SATA storage network element at one of said supported link rates;
instructions for receiving a reply data stream from said SAS/SATA storage network element at said one of said supported link rates;
instructions for reporting said one of said supported link rates as a common link rate if said reply data stream is received;
instructions for repeating the steps for each of the remaining supported link rates without said SAS/SATA storage network element entering an active state with said device;
instructions for determining a single link rate supported by all connected PHYs communicating in said SAS/SATA storage network system, the single link rate being one of said common link rates, and
instructions for restarting and performing speed negotiation with one of said common link rates.

22. The method of claim 1 wherein step f) comprises restarting and performing speed negotiation to completion with a set of common link rates.

23. The method of claim 1 wherein step e) comprises determining a single link rate supported by three or more connected PHYs communicating in said SAS/SATA storage network system.

24. The method of claim 1 further comprising:
implementing, in all the connected PHYs, the single link rate determined to be supported by all the connected PHYs.

25. The apparatus of claim 14 wherein said controller restarts and performs speed negotiation to completion with a set of common link rates.

26. The apparatus of claim 14 wherein the apparatus determines the single link rate supported by three or more connected PHYs communicating in said SAS/SATA storage network system.

27. The apparatus of claim 14 wherein said apparatus implements, in all the connected PHYs, the single link rate determined to be supported by all the connected PHYs.

28. The non-transitory computer readable medium of claim 21 further comprising instructions for restarting and performing speed negotiation to completion with a set of common link rates.

29. The non-transitory computer readable medium of claim 21 further comprising instructions for determining a single link rate supported by three or more connected PHYs communicating in said SAS/SATA storage network system.

30. The non-transitory computer readable medium of claim 21 further comprising instructions for implementing, in all the connected PHYs, the single link rate determined to be supported by all the connected PHYs.

* * * * *